United States Patent
Hrinevich, Jr. et al.

(10) Patent No.: US 6,858,350 B2
(45) Date of Patent: Feb. 22, 2005

(54) COMPOSITE MATERIALS AND METHODS OF FORMING

(75) Inventors: John Hrinevich, Jr., Grand Blanc, MI (US); Wellington Y. Kwok, Fishers, IN (US); Lu Zhang, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 495 days.

(21) Appl. No.: 09/878,476

(22) Filed: Jun. 11, 2001

(65) Prior Publication Data

US 2002/0187397 A1 Dec. 12, 2002

(51) Int. Cl.$^7$ .............................................. H01M 4/72
(52) U.S. Cl. ............................ 429/234; 29/2; 428/608
(58) Field of Search .............................. 429/234, 225, 429/129, 142, 144, 247, 254, 226; 29/2; 148/421; 428/608, 614, 611; 228/190, 193, 262 H

(56) References Cited

U.S. PATENT DOCUMENTS

| | | | | |
|---|---|---|---|---|
| 4,476,206 A | * | 10/1984 | Viala et al. | 429/234 |
| 4,906,540 A | * | 3/1990 | Hoshihara et al. | 429/242 |
| 5,558,728 A | * | 9/1996 | Kobayashi et al. | 148/421 |
| 6,316,148 B1 | * | 11/2001 | Timmons et al. | 429/241 |
| 6,617,071 B2 | | 9/2003 | Chen et al. | |

OTHER PUBLICATIONS www.semiconductor glossary.com: Semiconductor Glossary 2001.*
Recent Progress in Silicon Carbide Semiconductor Electronics Technology (Oct. 1995).*
Composites , Serdar S. Elgun (Nov. 19, 1999).*

* cited by examiner

Primary Examiner—Frankie L. Stinson
Assistant Examiner—Monique Wills
(74) Attorney, Agent, or Firm—Jimmy L. Funke

(57) ABSTRACT

A pack-bonded, multiphase composite material is provided. The multiphase composite material has at least two layers of a matrix material pack-bonded with at least one layer of a reinforcement material. The reinforcement material is oriented in a pack-bonded direction such that the reinforcement material is uniformly dispersed between the matrix materials. Additionally, the matrix materials and the reinforcement material are chemically dissimilar. The matrix material is selected from the group consisting of lead and lead alloys, and the reinforcement material is a plurality of non-conductive, large length-to-diameter ratio, low-density fibers.

17 Claims, 2 Drawing Sheets

COMPOSITE MATERIALS AND METHODS OF FORMING

TECHNICAL FIELD

This application relates to battery grids of composite materials and methods of forming such composite materials. More specifically, this application relates to the forming composite materials for use in battery plates.

BACKGROUND

Lead-acid batteries use reactive sponge lead for the negative electrode, lead dioxide for the positive electrode, and dilute sulfuric acid for the electrolyte. During discharge of a lead-acid battery, the active material is electrochemically converted into lead sulfate by the acid, producing an electric charge. The amount of lead sulfate formed on the plates, and the amount of acid lost from the electrolyte are in exact proportion to the rate of discharge. The reverse action takes place when the battery is recharged.

Pure metal or alloy materials have little structural strength, and thus, require additional support for use. Attempts to reinforce such electro-chemical materials have been provided in various ways. Traditionally, metal materials, such as lead, have been alloyed with other materials to provide the necessary structural rigidity to the finished grid. This method is not optimal, as it requires manufacturing steps that may add to the overall cost. Moreover, alloy materials that have the required structural properties typically have poor electro-chemical properties and, thus, decrease the efficiency of the alloyed grid.

Lead grid materials have also been cast with other materials to provide the necessary structural rigidity to the finished plate. For instance, U.S. Pat. No. 4,456,666 describes such a casting process. Similar to the methods discussed above, casting requires costly manufacturing steps and tends to reduce the electro-chemical properties of the grid. Moreover, casting provides a material with increased structural rigidity in all directions, which presents a problem when forming expanded metal grids as described below.

The materials are then formed into expanded grids. U.S. Pat. Nos. 3,853,626 and 3,945,097 to Daniels et al. describe exemplary methods and equipment for making such expanded grids and are herein incorporated by reference in their entirety. Importantly, expanded grids are expanded along a single, longitudinal axis. Thus, processes such as casting, which provided mechanical strength in all directions are not compatible with such expansion methods and equipment. Production equipment for producing such expanded grids are available. Thus, it is desirable for composite materials to be formable into expanded grids using current production equipment.

Accordingly, there is a continuing need for non-alloyed materials having high structural properties that maintain the electro-chemical and mechanical properties of the preprocessed material. Additionally, there is a need for such non-alloyed materials that are formable into expanded grids using current production equipment.

SUMMARY

An improved supporting material or battery grid, which functions as a mechanical support to hold active battery materials of a battery in place and conducts electricity from an external circuit to the active materials, the grid is formed from a composite material.

A pack-bonded, multiphase composite material. The multiphase composite material has at least two layers of a matrix material pack-bonded with at least one layer of a reinforcement material. The reinforcement material is oriented in a pack-bonded direction within the matrix material. Additionally, the matrix material and the reinforcement material are chemically dissimilar.

A method of producing a composite material. The method includes: (1) forming a stack of at least two layers of a matrix material interleaved with at least one layer of a reinforcement material; (2) providing the stack to a pack-bonding process; and (3) pack-bonding the stack such that the reinforcement material is uniformly dispersed within the matrix material in a pack-bonding direction.

A method of forming an expanded composite battery grid. The method includes: (1) interleaving at least two layers of a matrix material with at least one layer of a reinforcement material; (2) pack-bonding the matrix materials and the reinforcement material into a composite material; and (3) expanding and cutting the composite material to form the expanded composite battery grid.

The above-described and other features and advantages of this application will be appreciated and understood by those skilled in the art from the following detailed description, drawings, and appended claims.

DESCRIPTION OF THE PREFERRED EMBODIMENT

An exemplary embodiment is directed to composite materials and methods of producing such composite materials from which battery grids are wrought and expanded.

For lead acid batteries, pure lead has been suggested to be the best grid material due to its corrosion-resistant properties and ability to withstand the extreme temperature environment. However, the use of pure lead is restricted not from the standpoint of chemical or metallurgical characteristics, but by the practical issues of handling and processing of "soft" lead for high-speed commercial manufacturing. In addition, pure lead does not provide the necessary structural support for the grid material. In accordance with an exemplary embodiment, a reinforcing material is interwoven with at least two layers of lead for producing a composite material for use in a battery grid. Accordingly, the composite material transfers a substantial portion of the mechanical functions such as elasticity, stress, tensile strength and fracture toughness to a reinforcing material incorporated within a matrix material.

The resultant composite material provides increased physical properties without compromising its chemical properties. Additionally, the resultant composite material does not require the creation of an inter-metallic phase or internal galvanic cell from the alloying metal atoms (e.g., calcium, tin, antimony, silver, etc.).

A reinforcement material is incorporated within a matrix material to achieve a high strength and stiff design. The composite material has a microstructure that is strong in the wrought direction, a direction that is compatible with current expanded metal production equipment. Additionally, the composite material promotes future optimization designs of the matrix material based solely on electro-chemical and electrical conductivity properties with minimal compromise in the mechanical strength.

A composite is a multiphase material that exhibits a combination of properties that makes the composite superior to each of the component phases. For example, in nature, wood consists of strong and flexible cellulose fibers surrounded by and held together by a stiffer material called lignin. The combined mechanical characteristics are superior to those of either of the constituents. A common example of synthetic composite material is fiberglass, which is composed of glass fibers in a matrix of polyester. Metal alloys and most ceramics, on the other hand, are not composite because their multiple phases are formed naturally.

Figure 1:
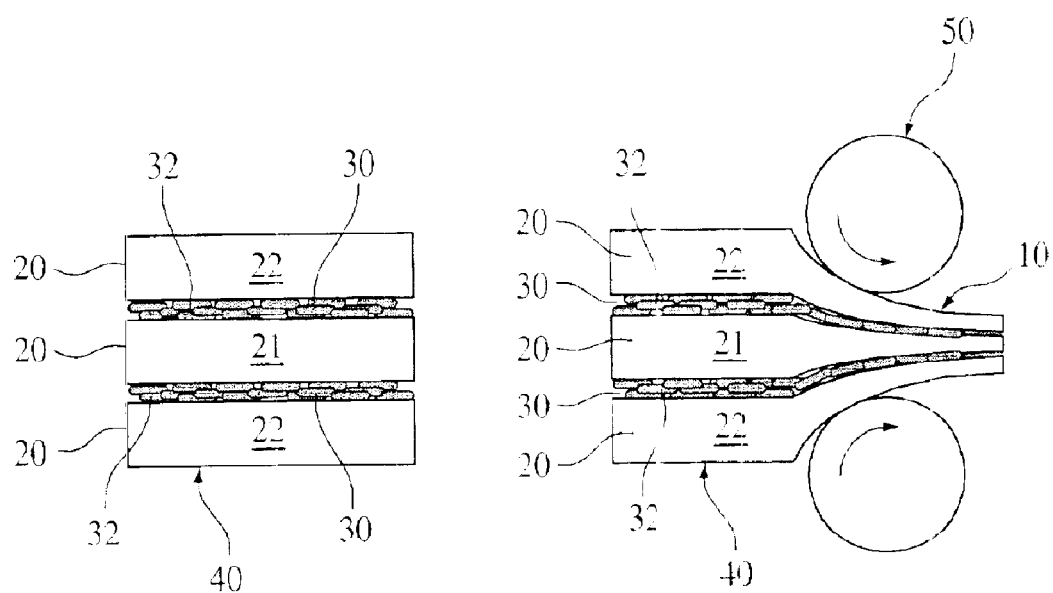
FIG. 1 shows an embodiment of the process of forming a composite material.

The composite material is a multiphase material that has chemically dissimilar phases and is separated by a distinct interface. Composite material 10 is shown in FIG. 1. Composite material 10, before process 50 (described below), includes a stack 40 of at least two layers of a matrix material 20 and at least one layer of a reinforcement material 30. Reinforcement material 30 is preferably a plurality of non-conductive, large length-to-diameter ratio, low-density fibers 32 that can withstand acidic, high temperature, and high-pressure environments. Thus, reinforcement material 30 provides composite 10 with high strength and stiffness, without affecting the electro-chemical properties of matrix material 20. Preferably, fibers 32 within reinforcement material 30 have a diameter of in a range from about 0.5 microns to about 15 microns, and composite 10 includes a volume of the reinforcement material in concentrations in a range from about 0.01% to about 0.1%.

Matrix material 20 is, for example, lead or a lead alloy. Reinforcement material 30 includes polymer or ceramic materials, such as but not limited to nylon, glass, polymeric aramids, aluminum oxide, graphite, alumina-type glass fibers, metallized fibers, polymeric fibers, and the like, in either polycrystalline or amorphous forms. In a preferred embodiment, matrix material 20 is a lead alloy, and reinforcement material 30 is a plurality of micro glass fibers 32.

Composite 10 of reinforcement material 30 and matrix material 20 transmits and distributes stress on the composite to the reinforcement material. Composite 10 also protects reinforcement material 30 from damage as a result of mechanical abrasion or chemical reaction, and prevents the propagation of brittle cracks. Composite 10 also provides a surface for receiving and supporting an active material.

A first embodiment of a process to bind reinforcement material 30 and matrix material 20 together is provided in FIG. 1. Multiple layers of matrix material 20 and reinforcement material 30 are formed into stack 40. Stack 40 is formed by uniformly spraying, printing, sprinkling, or applying a sheet or film of reinforcement material 30 to matrix material 20. Preferably, stack 40 has an interleaved or layered arrangement of matrix material 20 and reinforcement material 30 as shown in FIG. 1. By way of example, stack 40 is described as having three layers of matrix material 20 and two layers of reinforcement material 30, and one cold-rolling process 50 (described below). However, alternate numbers of layers of each matrix material 20 and reinforcement material 30, and alternate numbers of cold-rolling steps 50 are considered within the scope of the present application.

Layering or interleaving of matrix material 20 and reinforcement material 30 to form stack 40 permits structural orientation of the reinforcement material. Thus, inner layer 21 of matrix material 20 is stiffened by reinforcement material 30 on two sides, but outer layer 22 is stiffened on only one side. After stack 40 is formed, the stack is passed through one or more cold-rolling processes 50 to pack-bond matrix material 20 and reinforcement material 30, forming composite 10. This composite 10 provides a grid material that is mechanically strong and relatively corrosion-resistant.

Accordingly, the composite material or battery grid can function as a mechanical support to hold active materials (e.g., paste material and, to some extent, electrolytes) in place and conduct electricity from the external circuit to the active material.

Figure 2:
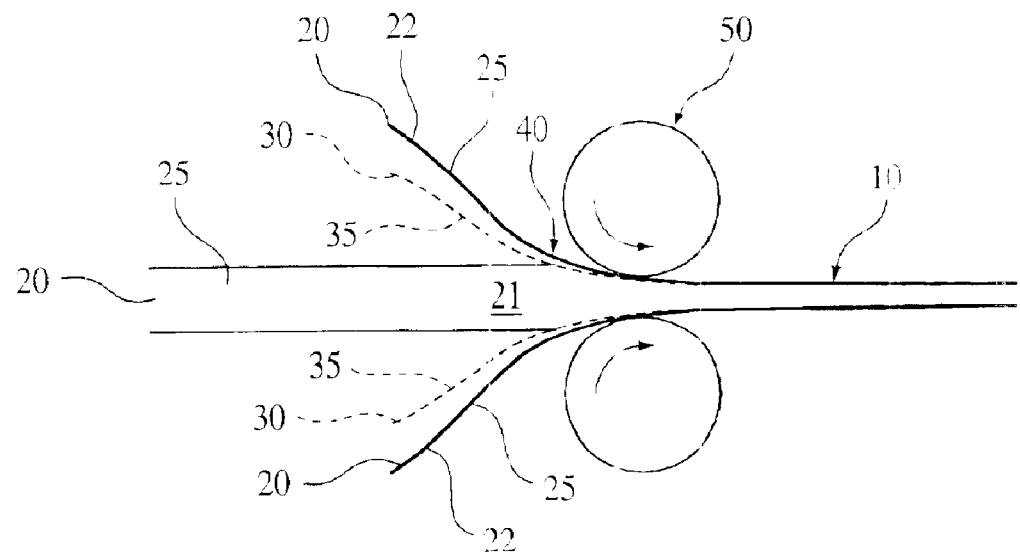
FIG. 2 shows an alternate embodiment of the process of forming a composite material.

An alternative continuous process to bind reinforcement material 30 and matrix material 20 together is illustrated in FIG. 2. In this embodiment, stack 40 is provided using two continuous films or sheets 35 of reinforcement material 30 and three continuous films 25 of matrix material 20, and one or more cold-rolling processes 50 to pack-bond the films together. Preferably, film 35 and film 25 are provided to cold-rolling process 50 in an interleaved or layered arrangement as shown in FIG. 2.

By way of example, the continuous process is described as having three films 25 of matrix material 20, two films 35 of reinforcement material 30, and one cold rolling step 50. However, alternate numbers of films of each matrix material 20 and reinforcement material 30, and alternate numbers of cold-rolling steps 50 are considered within the scope of the present application.

Preferably, inner film 21 of matrix material 20 has a substantial thickness while outer films 22 have minor thicknesses. In a first embodiment, outer films 22 are the same matrix material 20 as inner film 21. Alternately, outer films 22 are a different matrix material 20 than inner film 21, and the outer films 22 have specific predetermined surface properties, such as, but not limited to scratch resistance, acid resistance, color, and the like.

Figure 3:
FIG. 3 shows the microstructure of the composite material.

Preferably, cold-rolling process 50 described above completely integrates fibers 32 of reinforcement material 30 within the layers of matrix material 20 such that the fibers are uniformly dispersed within the layers of the matrix material. FIG. 3 provides a cross sectional view of the resulting microstructure of composite 10.

Additionally, cold rolling process.50 also tends to orient fibers 32 within matrix material 20 in the rolling direction. Thus, composite 10 is reinforced in the direction of the rolling process 50, the rolling or longitudinal direction, but remains unchanged in the direction perpendicular to the rolling direction, the transverse direction. As described above, production equipment for producing expanded metal grids by expanding the material along a single, longitudinal axis are available. Thus, composite 10 allows the use of current production equipment, without any major modification, to produce expanded grids of the composite 10.

Figure 4:
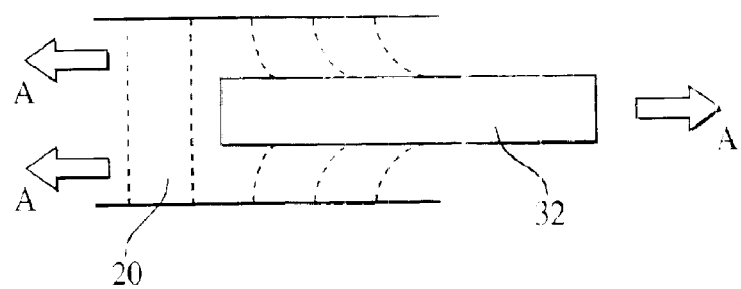
FIG. 4 shows the deformation pattern of the composite material under an applied stress.
Figure 5:
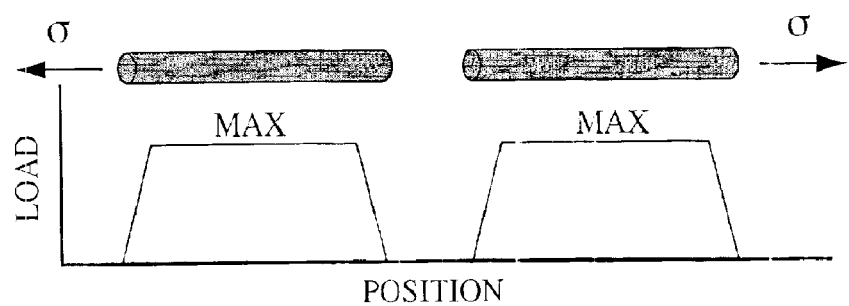
FIG. 5 shows the load distribution of the composite material under the applied stress of FIG. 4.

The overall strength of composite 10 depends not only on the tensile strength of reinforcement material 30, but also on the degree to which an applied stress is transmitted to the reinforcement material. Shown in FIGS. 4 and 5, a stress A applied to composite 10 yields a deformation pattern with constant load supports along the length and tapering off to zero at the end regions. The mechanical properties of composite 10 are highly anisotropic. In the longitudinal direction, the total load sustained by composite 10 is equal to the volume-fraction weighted average of loads carried by both reinforcement material 30 and matrix material 20. This longitudinal or isostrain loading represents the highest limit of stress and tensile strengths for composite 10.

An operable battery is finally produced by using the composite to form a grid in which an active material is pasted onto the grid. After drying or curing, a collection of interleaved positive and negative electrodes is collated to form a "cell", and the lugs on each plate of the corresponding polarity were connected by the cast-on-strap (COS) process. Six cells are then assembled in plastic case and connected in series using the EF welding process through the cell wall to form a "green-group battery". Then the battery is produced by (1) adding acid, also known as pickling or sulfation process, and (2) applying a charging current to electrochemically convert active materials, known as the formation process.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A pack-bonded, multiphase composite material for use in a cell of a battery, comprising:
    three layers of a matrix material pack-bonded with two layers of a reinforcement material, such that a top layer, a bottom layer and a middle layer of said matrix material are provided, wherein said top layer and said bottom layer are a first matrix material of a first thickness and said middle layer is a second matrix material of a second thickness wherein the first thickness is different from the second thickness, the reinforcement material being non-conductive, wherein fibers in said reinforcement material are oriented in a pack-bonded direction and wherein said matrix material and said reinforcement material are chemically dissimilar.

2. The pack-bonded material as in claim 1, wherein said reinforcement material is uniformly dispersed upon a surface of one of said matrix materials.

3. The pack-bonded material as in claim 1, wherein said matrix material is selected from the group consisting of lead and lead alloys.

4. The pack-bonded material as in claim 1, wherein said fibers are selected from the group consisting of nylon fibers, glass fibers, polymeric aramid fibers, aluminum oxide fibers, graphite fibers, alumina-type glass fibers, metallized fibers, polymeric fibers, and combinations thereof.

5. The pack-bonded material as in claim 1, wherein said first matrix material provides predetermined surface properties to the pack-bonded multiphase composite material.

6. A method of producing a composite material for a cell of a battery, comprising:
    forming a stack of three layers of a matrix material interleaved with two layers of a non-conductive reinforcement material, such that a top layer, a bottom layer and a middle layer of said matrix material are defined, wherein said top layer and said bottom layer are a first matrix material of a first thickness, and said middle layer is a second matrix material of a second thickness wherein the first thickness is different from the second thickness, and, said matrix material and said reinforcement material are chemically dissimilar;
    providing said stack to a pack-bonding process; and
    pack-bonding said stack such that said reinforcement material is uniformly dispersed within said matrix material in a pack-bonding direction.

7. The method according to claim 6, wherein said pack-bonding process comprises one or more cold-rolling processes.

8. The method according to claim 6, wherein said matrix material is selected from the group consisting of lead and lead alloys and said reinforcement material has a plurality of non-conductive fibers.

9. The method according to claim 8, wherein said fibers are selected from the group consisting of nylon fibers, glass fibers, polymeric aramid fibers, aluminum oxide fibers, graphite fibers, alumina-type glass fibers, metallized fibers, polymeric fibers, and combinations thereof.

10. The method according to claim 6, wherein said first matrix material provides predetermined surface properties to the composite material.

11. The method according to claim 6, wherein said stack forming step comprises:
    interleaving a top continuous film of said matrix material, a first continuous film of said reinforcement material, a middle continuous film of said matrix material, a second continuous film of said reinforcement material, and a bottom continuous film of said matrix material.

12. A method of forming an expanded metal battery plate, comprising:
    providing a stack comprising a top continuous film of said matrix material, a first continuous film of said reinforcement material, a middle continuous film of said matrix material, a second continuous film of said reinforcement material, and a bottom continuous film of said matrix material, wherein said top continuous film and said bottom continuous film are a first matrix material of a first thickness, and said middle continuous film is a second matrix material of second thickness wherein the first thickness is different from the second thickness, said matrix material and said reinforcement material are chemically dissimilar;
    pack-bonding said stack into a composite material, wherein said composite material includes said reinforcement material uniformly dispersed within said matrix material in a pack-bonding direction; and
    expanding and cutting said composite material to form the expanded metal battery plate.

13. The method according to claim 12, wherein said interleaving step comprises:
    providing a top continuous film of said matrix material, a first continuous film of said reinforcement material, a middle continuous film of said matrix material, a second continuous film of said reinforcement material, and a bottom continuous film of said matrix material.

14. The method according to claim 13, wherein said first matrix material provides predetermined surface properties to the composite material.

15. The method according to claim 12, wherein said pack-bonding step comprises one or more cold rolling processes.

16. A composite material for use in a cell of a battery, comprising:

first and second non-conductive layers of a non-conductive reinforcement material layer comprising fibers; and, first, second and third conductive layers of electrically conductive matrix material, arranged in a stack such that the first non-conductive layer is interleaved between the first and second conductive layers and the second non-conductive layer is interleaved between the second and third conductive layers, wherein the first and third conductive layers have a first thickness, and said second layer has a second thickness wherein the first thickness is different from the second thickness, wherein fibers in the reinforcement material layer are oriented in a predetermined direction by cold-rolling the first, second and third conductive layers and the first and second non-conductive layers.

17. A method for producing a composite material for a cell of a battery, comprising:

stacking a first layer of a non-conductive reinforcement material between first and second layers of electrically conductive matrix material and a second layer of said non-conductive reinforcement material between said second layer and a third layer of said electrically conductive matrix material, wherein the first and third layers of electrically conductive matrix material has a first thickness and said second layer of said electrically conductive matrix material has second thickness wherein the first thickness is different from the second thickness; and, cold-rolling the stack in a first direction wherein fibers in the reinforcement material layer are oriented substantially in the first direction.

* * * * *